US010119449B2

(12) United States Patent
Boekeloo et al.

(10) Patent No.: US 10,119,449 B2
(45) Date of Patent: Nov. 6, 2018

(54) SYSTEMS AND METHODS FOR RESTRAINING EXHAUST GAS DUCTS

(71) Applicant: The Boeing Company, Chicago, IL (US)

(72) Inventors: Eric Matthews Boekeloo, Seattle, WA (US); William Preston Keith, Lakewood, CA (US); Michael Best, Huntington Beach, CA (US); Aristidis Sidiropoulos, Huntington Beach, CA (US); Thomas Richardson Pinney, Long Beach, CA (US)

(73) Assignee: THE BOEING COMPANY, Chicago, IL (US)

( * ) Notice: Subject to any disclaimer, the term of this patent is extended or adjusted under 35 U.S.C. 154(b) by 59 days.

(21) Appl. No.: 15/226,451

(22) Filed: Aug. 2, 2016

(65) Prior Publication Data

US 2018/0038261 A1 Feb. 8, 2018

(51) Int. Cl.
| | | |
|---|---|---|
| *F01N 13/08* | (2010.01) | |
| *B64D 29/00* | (2006.01) | |
| *F02K 1/48* | (2006.01) | |
| *F02K 1/80* | (2006.01) | |
| *B64D 33/04* | (2006.01) | |

(52) U.S. Cl.
CPC ............ *F01N 13/082* (2013.01); *B64D 29/00* (2013.01); *F02K 1/48* (2013.01); *F02K 1/80* (2013.01); *B64D 2033/045* (2013.01); *F01N 2590/00* (2013.01); *F05D 2260/30* (2013.01); *F05D 2260/96* (2013.01)

(58) Field of Classification Search
CPC ...... F01N 13/082; F01N 2590/00; F02K 1/48; F02K 1/80; F05D 2260/30; F05D 2260/96; B64D 29/00; B64D 2033/045

USPC .................................. 60/262, 264; 415/145
See application file for complete search history.

(56) References Cited

U.S. PATENT DOCUMENTS

| | | | |
|---|---|---|---|
| 4,335,801 A | 6/1982 | Stachowiak et al. | |
| 5,265,807 A | 11/1993 | Steckbeck et al. | |
| (Continued) | | | |

FOREIGN PATENT DOCUMENTS

| | | | |
|---|---|---|---|
| JP | H 112156 | * | 6/1999 |
| JP | H112156 A | | 6/1999 |

OTHER PUBLICATIONS

U.S. Appl. No. 14/689,265.
Extended European Search Report dated Dec. 8, 2017 issued in corresponding European Application No. 17168894.8.

*Primary Examiner* — Hoang Nguyen
(74) *Attorney, Agent, or Firm* — MH2 Technology Law Group LLP

(57) ABSTRACT

Methods and systems for restricting movement in a flow mixer of an exhaust duct, the flow mixer having a first row of flutes and a second row of flutes generally opposite to the first row of flutes, each flute being elongated and defining an elongated axis. At least two flute ties connect, or couple, together at least two flutes from the first row of flutes and at least two flutes from the second row of flutes. A retainer is coupled to the flute ties and extends generally perpendicularly to the elongated axis of each of the flutes from the first and second rows of flutes. The combination of the retainer and flute ties is configured to generally restrain relative movement between the flutes from the first row and the flutes from the second row.

20 Claims, 11 Drawing Sheets

(56) References Cited

U.S. PATENT DOCUMENTS

| | | | | |
|---|---|---|---|---|
| 6,016,651 A | * | 1/2000 | Hammond | B64D 33/04 239/265.17 |
| 8,061,144 B1 | * | 11/2011 | Maguire | F02K 3/10 60/262 |
| 2006/0207239 A1 | * | 9/2006 | Anderson | F02K 1/386 60/262 |
| 2008/0115484 A1 | * | 5/2008 | Conete | F02K 1/48 60/262 |
| 2014/0241863 A1 | * | 8/2014 | Tardif | F01D 25/24 415/145 |
| 2014/0260283 A1 | | 9/2014 | Bouchard et al. | |

\* cited by examiner

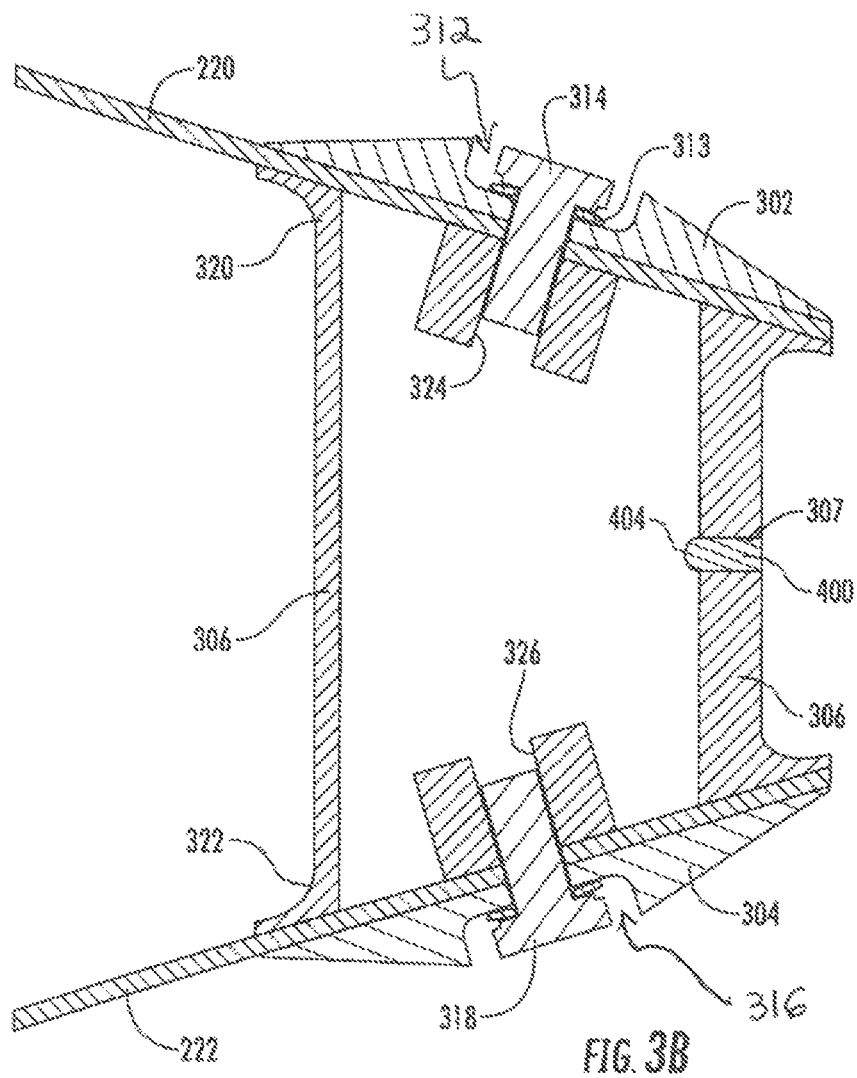

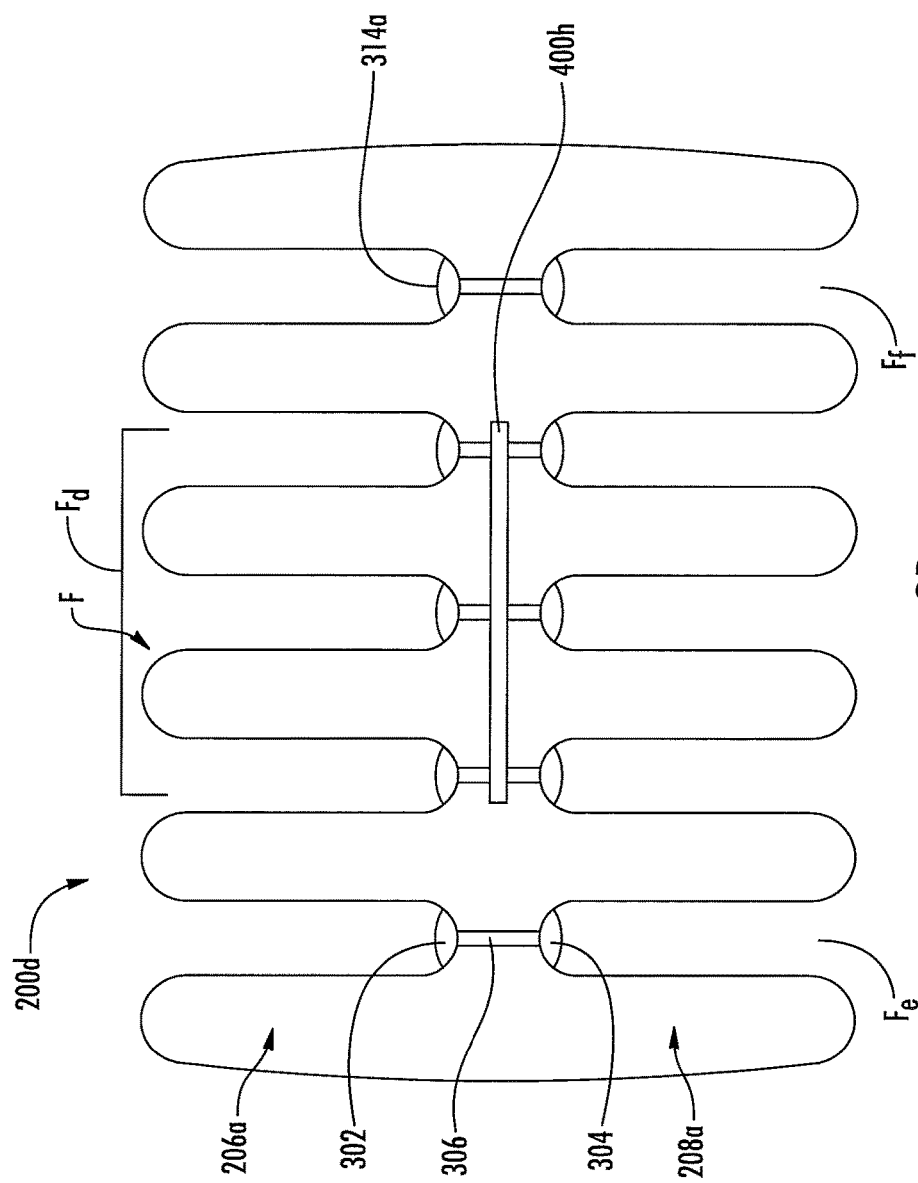

SYSTEMS AND METHODS FOR RESTRAINING EXHAUST GAS DUCTS

STATEMENT REGARDING FEDERALLY SPONSORED RESEARCH & DEVELOPMENT

This disclosure was made with Government support under Technology Investment Agreement contract W911W6-13-2-0003 awarded by the Department of Defense. The government has certain rights in this invention.

BACKGROUND

This invention relates generally to systems and methods for restricting movement in ducts, and, more generally, to methods and systems for increasing the natural frequency of a duct.

Exhaust systems for aircraft or other vehicles may have features that mix hot exhaust air and cooler ambient air to limit temperatures of the surrounding vehicle structure or to limit the heat signature of the vehicle. One method of achieving cooler exhaust temperatures is to attach a flow mixer to the outlet of the exhaust system. At least some known flow mixers include a plurality of lobes, or "flutes," that promote mixing of the exhaust air and cooler ambient air.

A potential drawback is that the stiffness of the flow mixer may be reduced because of the lobed or fluted designs. Consequently, at engine or rotor frequencies that align with the flow mixer's natural frequency, such alignment of natural frequencies (resonance) may lead to increased deflection and stresses that may limit or prevent use of a fluted design, or may require use of thicker, heavier duct walls. Further, static and/or dynamic pressures on the walls of the flutes may cause large deflections in the area of the flutes and may impact flow mixing.

Duct size and configuration of an exhaust system may also contribute to natural frequency. At least some known exhaust systems use ducts having relatively small flow mixers in an attempt to avoid certain frequencies without additional stiffening features. However, such relatively low-flow mixers may not provide optimal efficient mixing of hot exhaust air and cooler ambient air. Furthermore, at least some exhaust systems may use multiple small, relatively low-flow mixers to increase the mixing efficiency. However, multiple flow mixers may increase manufacturing costs, maintenance costs, and/or weight associated with the exhaust system.

SUMMARY

In one aspect, the system described herein includes a duct for directing a flow of exhaust, the duct including a wall portion defining a passageway having an inlet portion adapted to receive the flow of exhaust and an outlet portion adapted to discharge the flow of exhaust. A plurality of flutes is defined at the outlet portion, and the plurality of flutes include a first flute and a second flute spaced from the first flute. The first flute has a peak, a trough, a first height dimension and a first width dimension generally perpendicular to the first height dimension, and the second flute has a peak, a trough, a second height dimension and a second width dimension generally perpendicular to the second height dimension. At least one retainer is coupled to the trough of the first flute and the trough of the second flute and extends generally parallel to at least one of the first width dimension and the second width dimension, wherein the retainer is configured to restrain relative movement between the first flute and the second flute and relative movement among the first flute, the second flute, and at least one of the inlet portion and the outlet portion during the flow of exhaust through the duct.

In another aspect, a stiffener apparatus for an exhaust duct is described and includes a first row of flutes and a second row of flutes generally opposite to the first row of flutes, and each flute is elongated along a respective axis, and the stiffener apparatus includes at least two flute ties coupling together at least two flutes from the first row of flutes to at least two flutes from the second row of flutes. At least one retainer is coupled to the at least two flute ties and extends generally perpendicularly to the axis of each of the at least two flutes from the first row of flutes and the at least two flutes from the second row of flutes, wherein the retainer is configured to generally restrain relative movement between the at least two flutes from the first row of flutes and the at least two flutes from the second row of flutes.

In a further aspect, a method is described for increasing the resonant frequency of an exhaust system having at least one duct, the duct including a plurality of flutes. Each flute includes a trough and an elongated portion with a respective axis and a lateral portion extending generally perpendicular to the respective axis, wherein the length of the elongated portion is greater than the width of the lateral portion. The method includes selecting a first flute from the plurality of flutes, the first flute having a first axis and selecting a second flute from the plurality of flutes, the second flute having a second axis generally parallel to the first axis. The retainer is oriented to extend generally perpendicular to the first and second axes, and a first portion of the retainer is coupled to the trough of the first flute and a second portion of the retainer is coupled to the trough of the second flute such that the retainer generally restrains movement between the first flute and the second flute.

In one implementation, a method is described for increasing the resonant frequency of an exhaust system having at least one duct, the duct including at least one row of flutes with a first side of the row having flutes oriented in a first direction and a second side of the row having flutes oriented in a second direction generally opposite to the first direction. Each flute defines an elongated portion extending along a respective axis and a lateral portion extending generally perpendicular to the respective axis, wherein the length of the elongated portion is greater than the width of the lateral portion. The method includes selecting a first flute and a second flute from the first side of the row of flutes and selecting a third flute and a fourth flute from the second side of the row of flutes. A first flute tie is coupled to the first flute and the third flute such that the first flute tie is generally parallel to the axis of each of the first flute and the third flute, and a second flute tie is coupled to the second flute and the fourth flute such that the second flute tie is generally parallel to the axis of each of the second flute and the fourth flute. A retainer is oriented generally perpendicular to a length of at least one of the first flute tie and the second flute tie. A first portion of the retainer is coupled to the first flute, and a second portion of the retainer is coupled to the second flute such that the retainer restrains movement between the first flute and the second flute, wherein the retainer restrains movement among the first flute, second flute, third flute, and fourth flute.

In another implementation, an aircraft is described which includes an implementation of a duct as described herein.

The features, functions, and advantages that have been discussed can be achieved independently in various examples or may be combined in yet other examples, further details of which can be seen with reference to the following description and drawings.

BRIEF DESCRIPTION OF THE DRAWINGS

Figure 1:
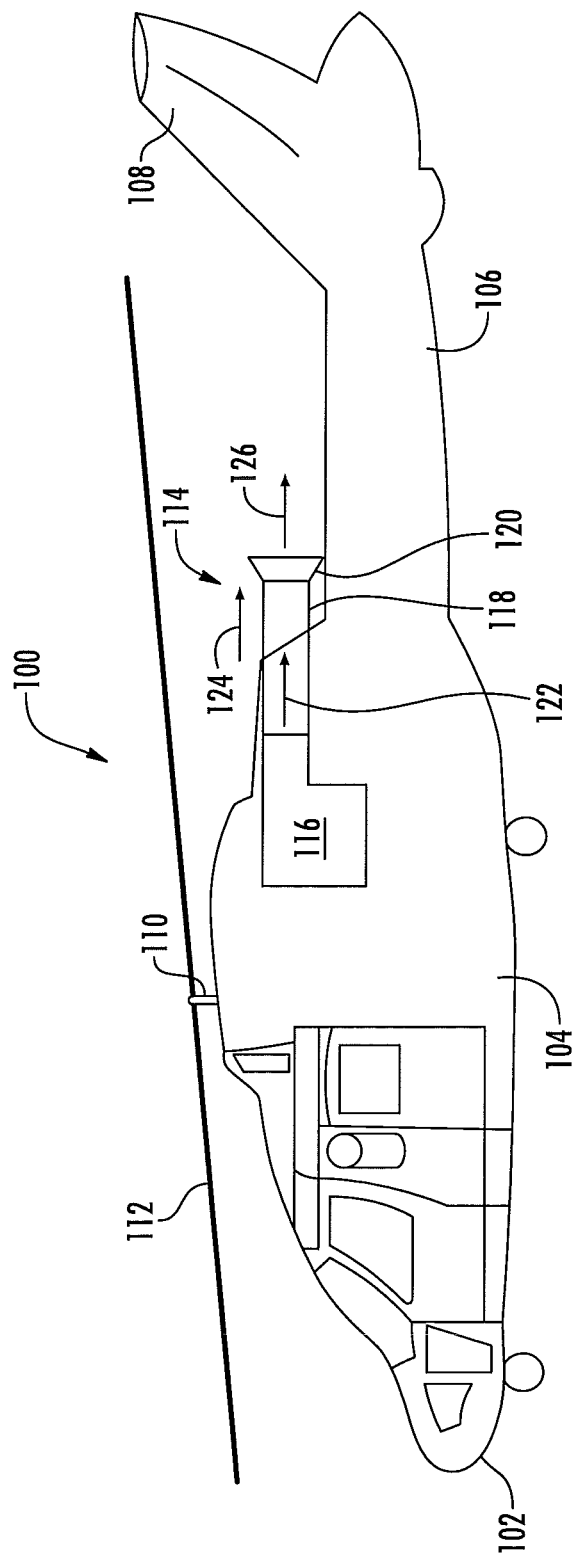
Figure 2:
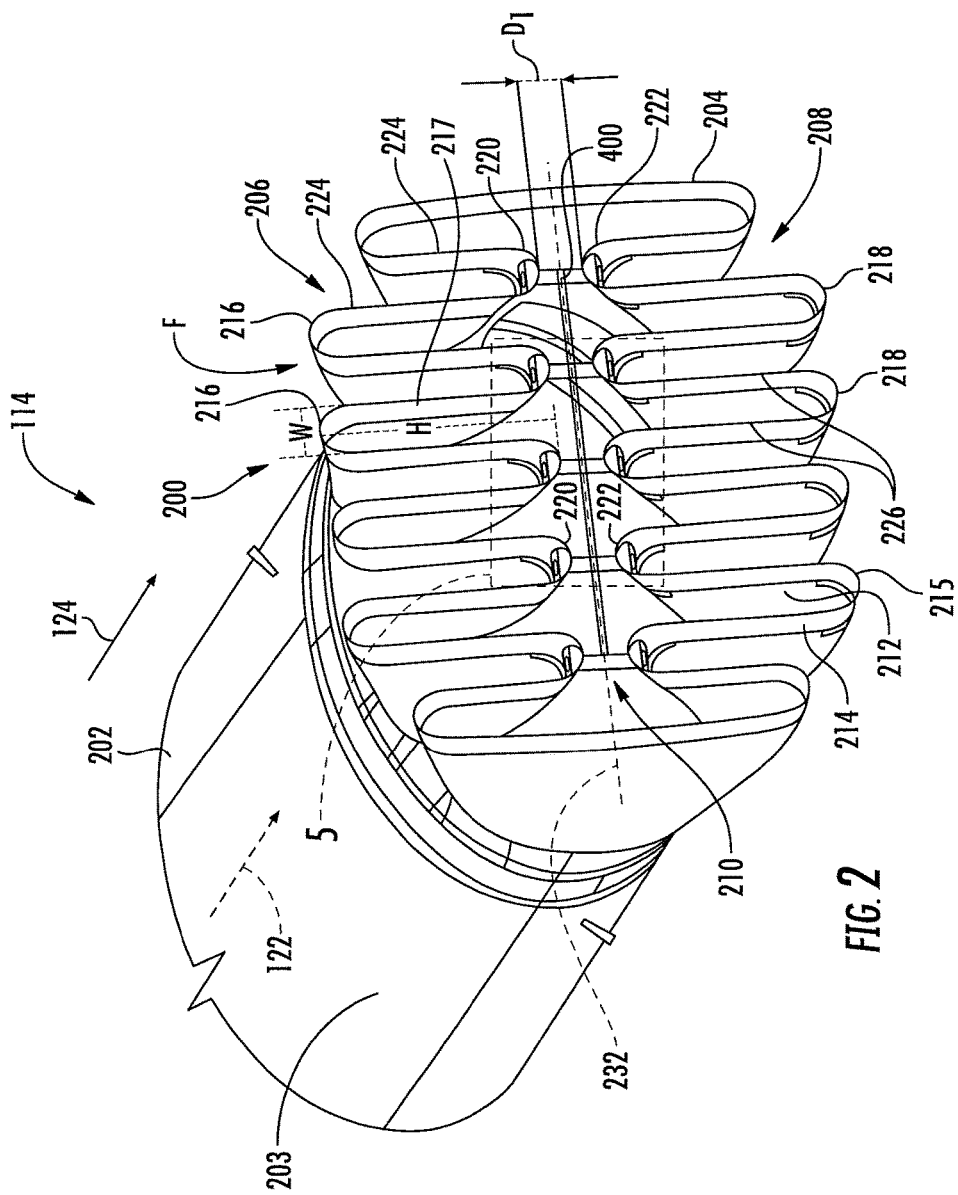
Figure 3A:
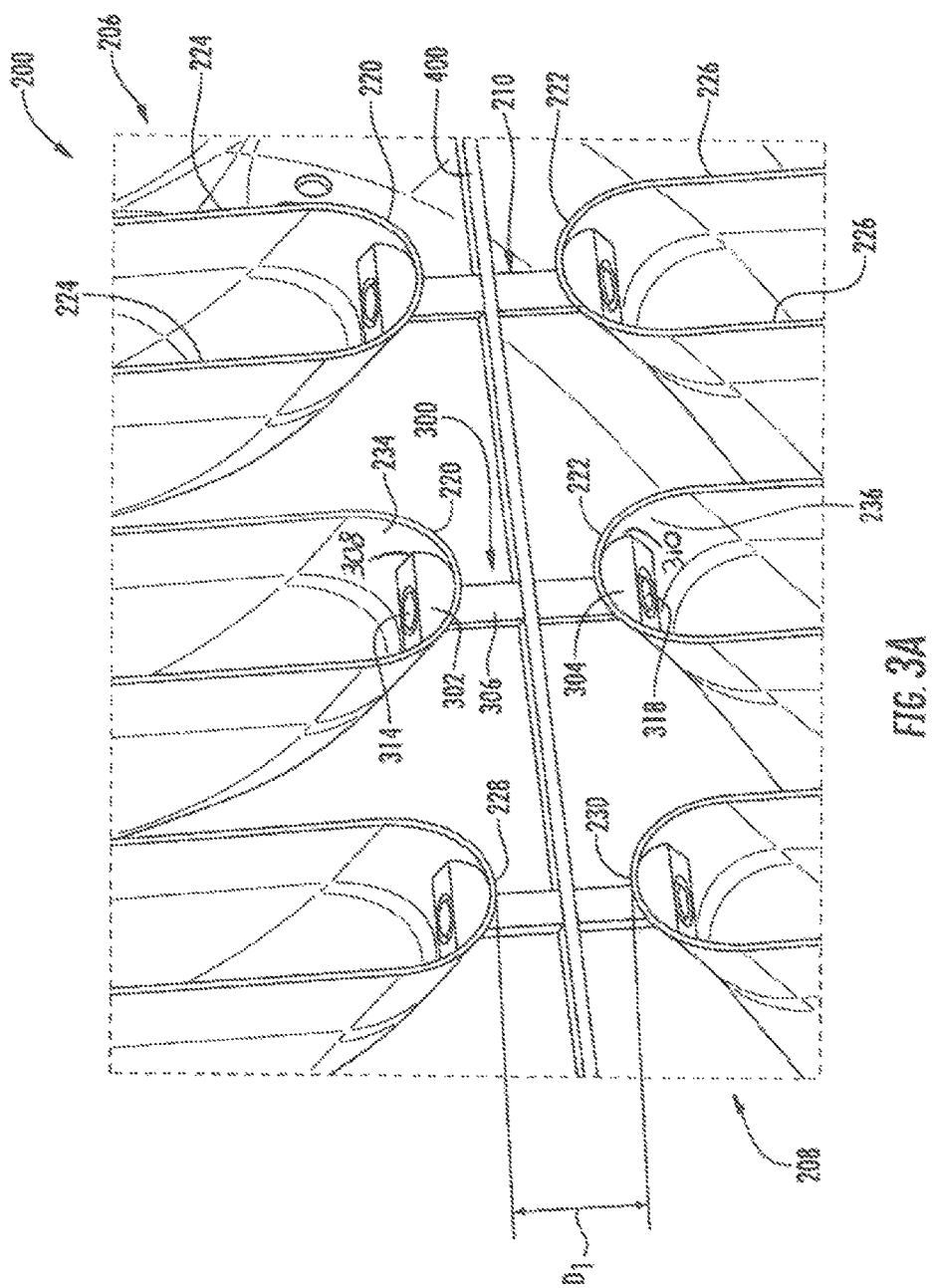
Figure 4:
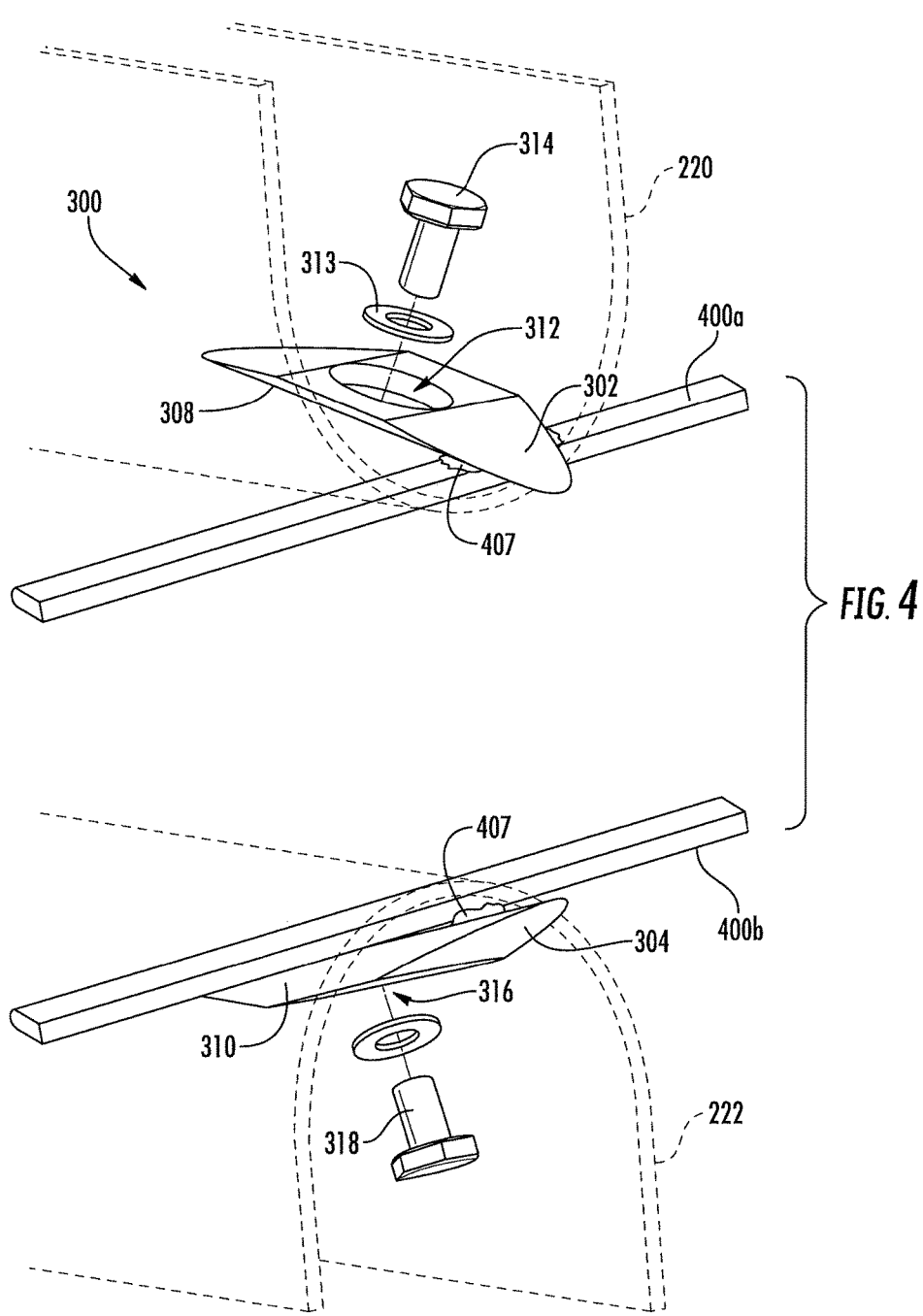
Figure 5A:
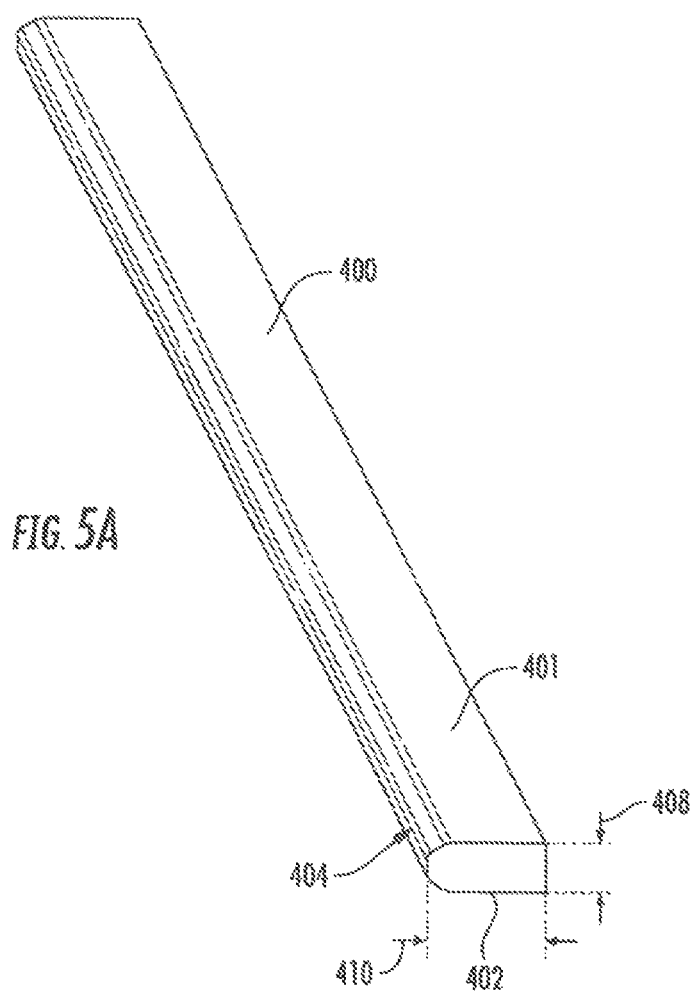
Figure 5B:
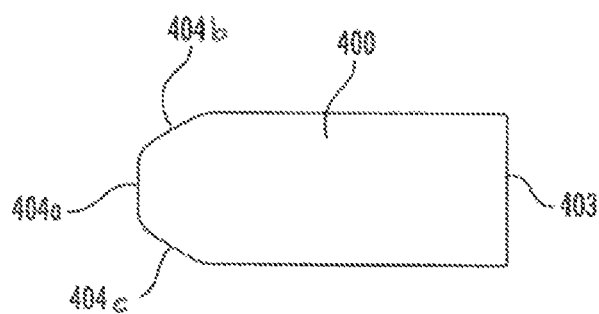
Figure 6:
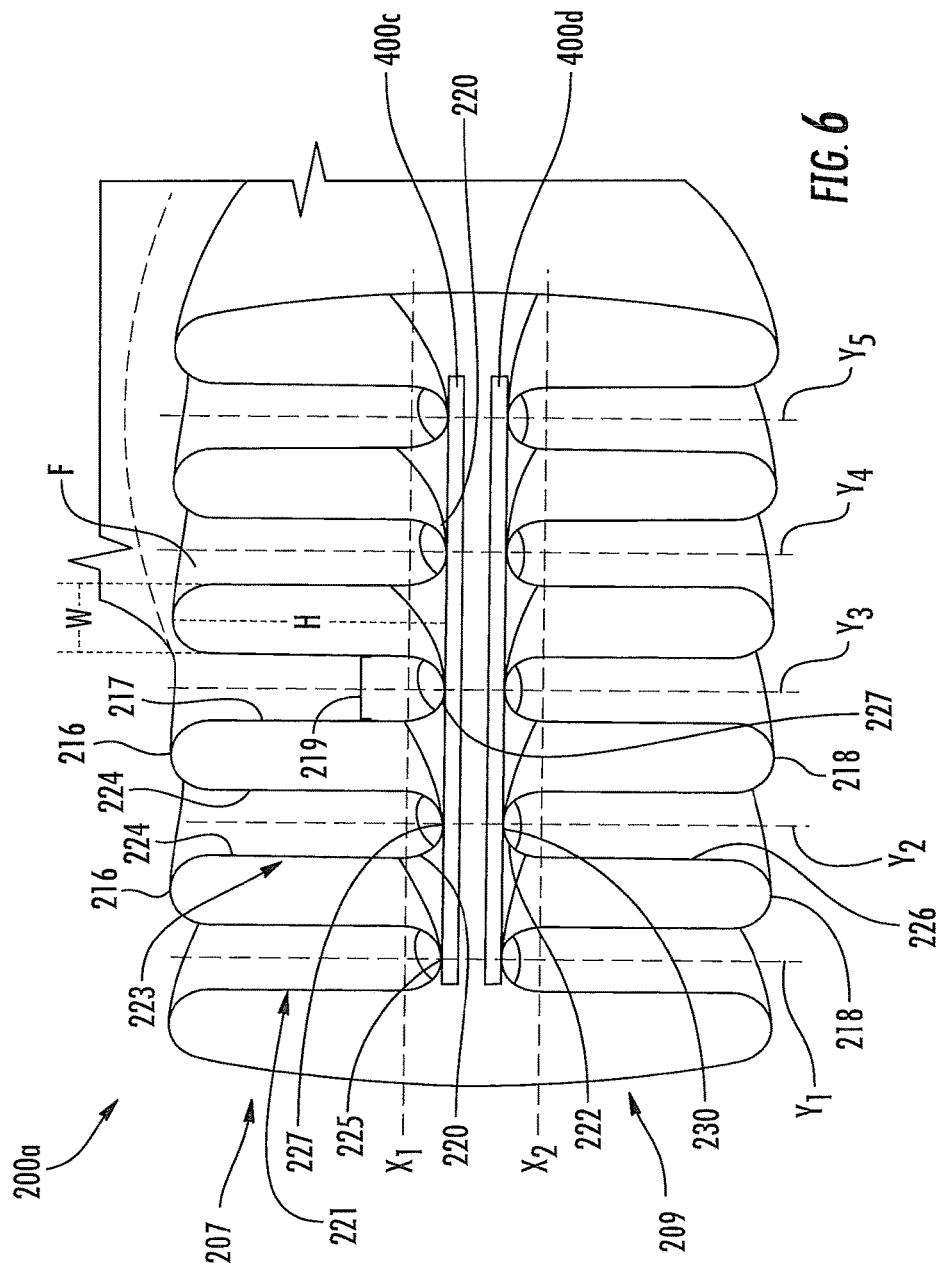
Figure 7:
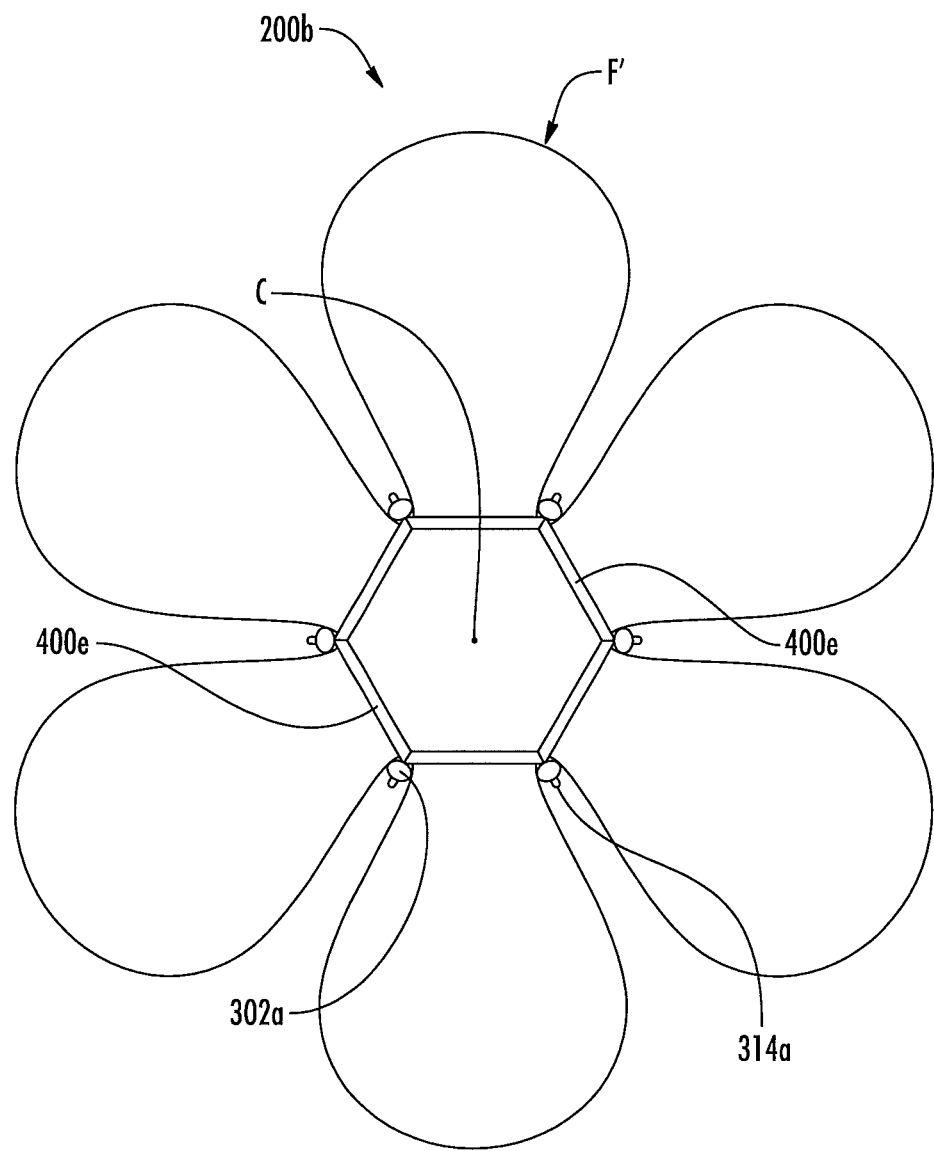
Figure 8A:
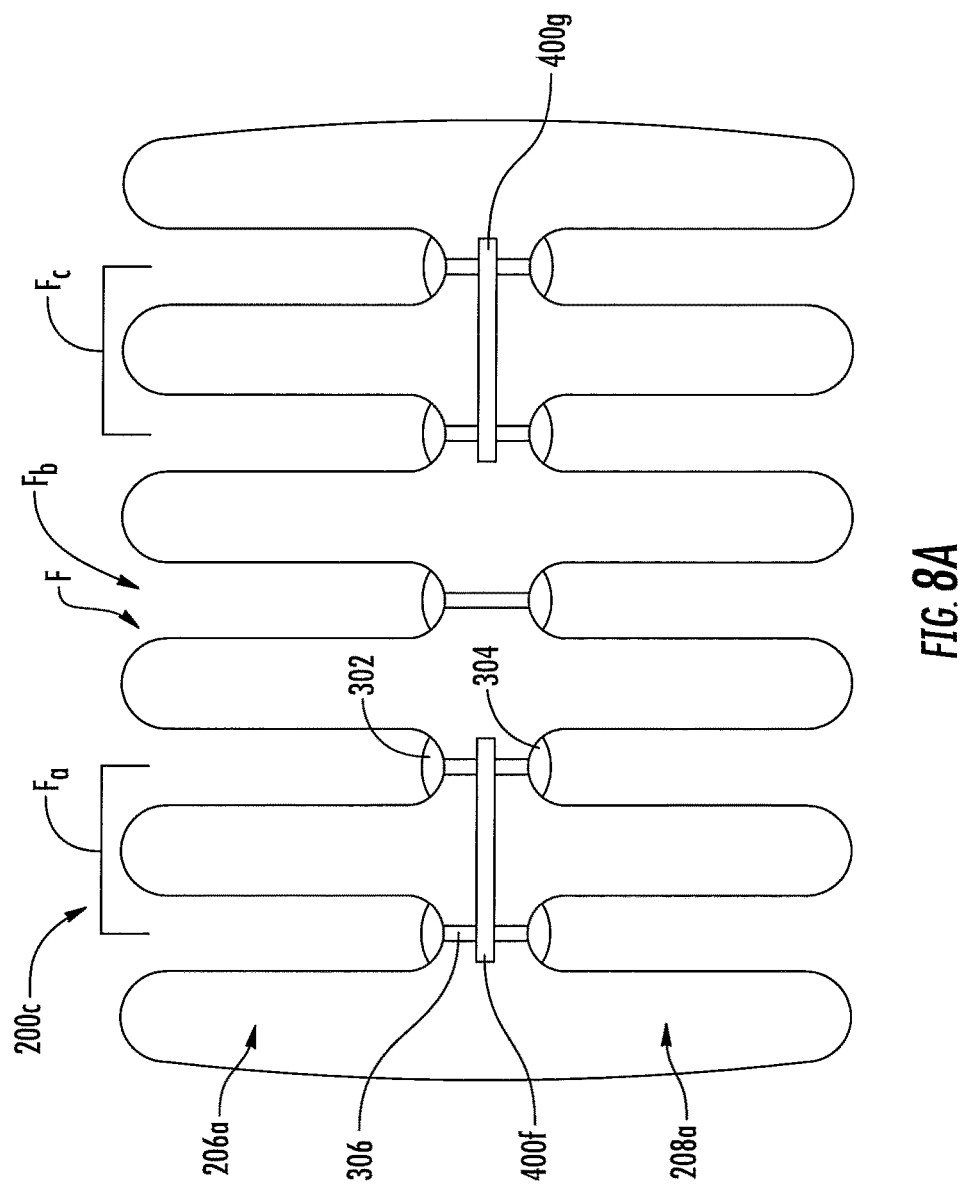
Figure 9:
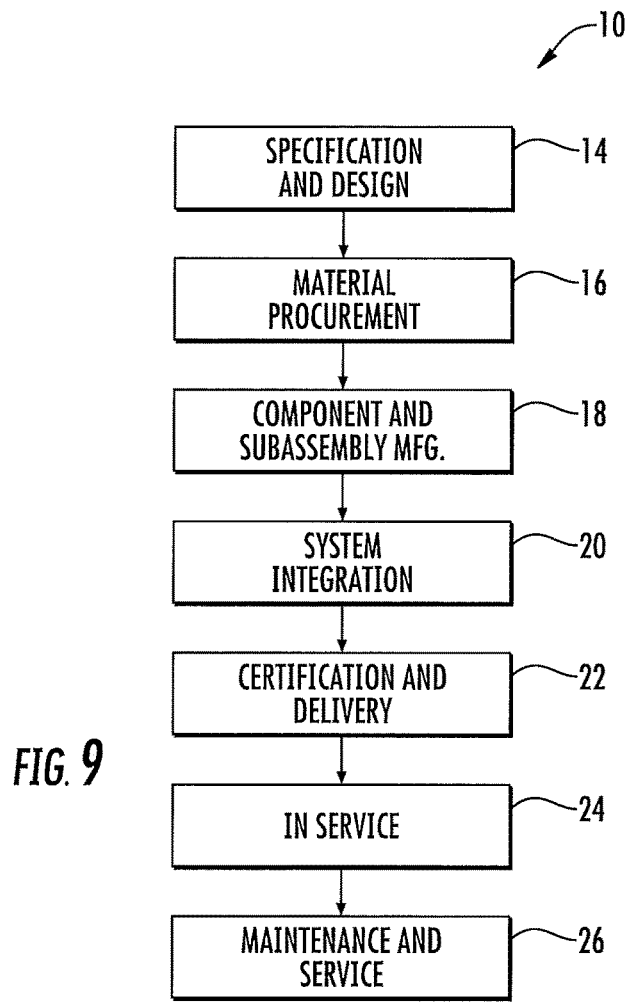
Figure 10:
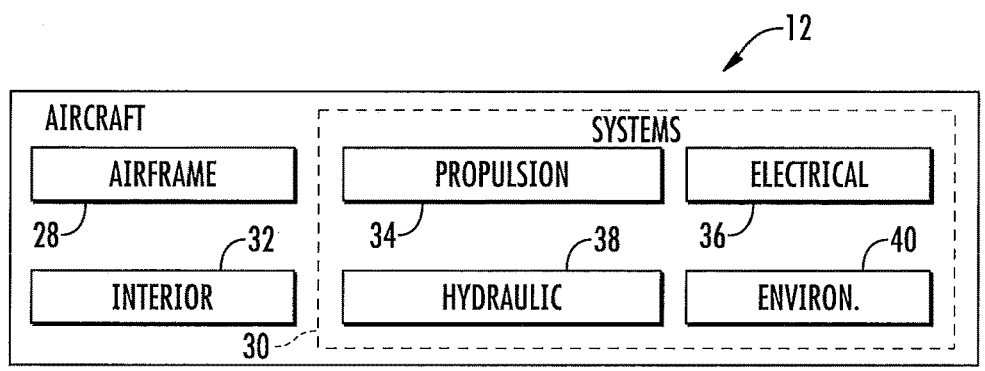

Having thus described exemplary aspects of the disclosure in general terms, various features and attendant advantages of the disclosed concepts will become more fully appreciated as the same becomes better understood when considered in conjunction with the accompanying drawings, which are not necessarily drawn to scale, in which like reference characters designate the same or similar parts throughout the several views, and wherein:

FIG. 1 is a side view of an exemplary aircraft including an exemplary exhaust system;

FIG. 2 is a perspective view of a portion of the exhaust system shown in FIG. 1 illustrating an exhaust duct with an exemplary flow mixer and showing one implementation of a stiffener, or retainer, of the present disclosure;

FIG. 3A is an enlarged view of a portion of the flow mixer shown in FIG. 2;

FIG. 3B is sectional view of one implementation of a flute tie and a retainer in accordance with the present disclosure;

FIG. 4 is a schematic view of an alternate implementation of a first retainer and a second retainer each being attached to an opposing flute of an exhaust system;

FIG. 5A is a perspective view of one implementation of a retainer of the present disclosure;

FIG. 5B is a sectional view of the retainer shown in FIG. 5A;

FIG. 6 is a perspective view of an alternative implementation showing a first retainer attached to an upper row of flutes and a second retainer attached to a lower row of flutes;

FIG. 7 is an end view of an alternate implementation illustrating an outlet of an exhaust system having radially disposed flutes and a plurality of retainers coupled to such flutes;

FIG. 8A is a schematic view of an alternate implementation illustrating an outlet of an exhaust system having a first retainer coupled to two pairs of opposing flutes and a second retainer coupled to another pair of opposing flutes;

FIG. 8B is a schematic view of an alternate implementation illustrating an outlet of an exhaust system having a first retainer coupled to two pairs of opposing flutes and a second retainer coupled to three medial, or central, pairs of flutes;

FIG. 9 is a flow diagram of an exemplary aircraft production and service methodology; and FIG. 10 is a block diagram of an exemplary aircraft.

DETAILED DESCRIPTION

Examples of the present disclosure will now be described more fully hereinafter with reference to the accompanying drawings, in which some, but not all examples of the disclosure are shown. Indeed, various exemplary aspects of the disclosure may be embodied in many different forms and should not be construed as limited to the examples set forth herein. Rather, these examples are provided so that this disclosure will be thorough and complete and will fully convey the scope of the disclosure to those skilled in the art. Like reference numerals refer to like elements throughout.

The systems and/or methods described herein may restrict or restrain movement of an exhaust system by, at least in part, stiffening the exhaust system or a portion thereof to increase the natural frequency of the exhaust system while facilitating efficient mixing of hot exhaust air and cooler ambient air. More specifically, the herein-described systems and methods may restrain and/or stiffen an exhaust duct. In one aspect, at least one retainer is coupled to at least two flutes of a fluted duct to prevent relative movement between the flutes, thus facilitating reduction in stresses in the flutes.

Referring now to FIG. 1, an aircraft 100 is illustrated. In a particular implementation, aircraft 100 is a rotorcraft. In other suitable implementations, the aircraft 100 may be vehicle that travels through airspace, such as, but not limited to, airplanes, unmanned aerial vehicles (UAVs), gliders, helicopters, spacecraft, and reusable launch vehicles, and/or any other object that travels through airspace. Furthermore, although the embodiments described herein are described as related to an aircraft, it is contemplated that systems and methods described herein can be implemented on any ground vehicle or waterborne vessel.

In the exemplary implementation, aircraft 100 is a rotorcraft including a nose 102, a body 104, a boom 106, and a tail 108. A rotorshaft 110 extends outward from body 104 and is coupled to at least one rotor 112 that rotates about rotorshaft 110 to provide aircraft 100 with lift and thrust. Aircraft 100 also includes an exhaust system 114 that includes an engine 116, an exhaust duct 118, and a flow mixer 120. Engine 116 is generally located in body 104 and is coupled to rotorshaft 110 such that engine 116 provides the power necessary to rotate rotorshaft 110. During operation, engine 116 generates hot exhaust gases 122 that are channeled through exhaust duct 118 and discharged from aircraft 100 through flow mixer 120 to the relatively cooler ambient air 124. Flow mixer 120 is configured to mix the flows of exhaust gas 122 and ambient air 124 to produce a gases mixture 126 that reduces the effect of hot exhaust gases 122 impinging on downstream components of aircraft 100, such as boom 106 and tail 108. Mixing of exhaust gases 122 and ambient air 124 also facilitates reducing the heat signature of aircraft 100 to potentially conceal aircraft 100 from detection and heat seeking weapons.

FIG. 2 is a perspective view of a portion of exhaust system 114 illustrating exhaust duct 118, which includes an inlet end, or portion, 202, and an outlet end, or portion, 204 with an exemplary flow mixer 200. An intermediate portion 203 between the inlet portion 202 and the outlet portion 204 is configured to channel the flow of exhaust between the inlet portion 202 and the outlet portion 204. Flow mixer 200 is one implementation of flow mixer 120 that may be used with exhaust system 114. In the implementation shown in FIG. 2, flow mixer 200 is fabricated from a ceramic matrix composite (CMC) material that is able to repeatedly withstand exposure to hot exhaust gases 122. In another suitable implementation, flow mixer 200 is fabricated from a metallic or metal alloy material. Generally, flow mixer 200 may be fabricated from any material that facilitates operation of exhaust system 114 as described herein.

Inlet end 202 of exhaust duct 118 is coupled to an outlet end of exhaust system 114. In the exemplary embodiment, outlet end 204 of exhaust duct 118 transitions gradually from the inlet end 202 to a lobed or fluted shape that facilitates mixing flow of hot exhaust gases 122 from exhaust duct 118 with cooler ambient air. Outlet end 204 includes a plurality of flutes, generally F, that are spaced circumferentially about outlet end 204 to form flow mixer 200. More specifically, in the exemplary implementation, plurality of flutes F at outlet end 204 includes a plurality of adjacent upper flutes 206 and a plurality of adjacent lower flutes 208 that are spaced from one another in two horizontal rows perpendicular to the plane of outlet end 204. Upper flutes 206 are spaced from lower flutes 208 by a predetermined distance $D_1$ such that a gap 210 is defined between upper flutes 206 and lower flutes 208. In another suitable implementation, flow mixer 200 may be oriented at 90 degrees or some other angle from the orientation shown in FIG. 2 such that outlet end 204 includes two substantially vertically-oriented or otherwise oriented rows of flutes. Generally, flow mixer 200 may be oriented in any manner that facilitates operation of flow mixer as described herein.

Outlet end 204 is formed by a continuous inner surface 212 and outer surface 214, respectively, of a wall portion, generally 215. Wall portion 215 includes elongated portions 217 that form a plurality of vertically-oriented, alternating flute peaks and flute troughs. More specifically, upper flutes 206 each include an upper peak 216, and lower flutes 208 each include a lower peak 218. Similarly, upper flutes 206 each include an upper trough 220, and lower flutes 208 each include a lower trough 222. Wall portion 215 defines a plurality of sidewalls 224 and a plurality of sidewalls 226. Each sidewall 224 and 226 has a height dimension, and a width dimension is defined between adjacent sidewalls 224 or 226. The height dimensions are oriented substantially vertically and are parallel to each adjacent sidewall 224 and/or 226. In another suitable implementation, sidewalls 224 and/or 226 may have any orientation and may not be parallel to an adjacent sidewall 224 and/or 226.

In an exemplary embodiment, upper flutes 206 are defined by plurality of sidewalls 224. Each upper peak 216 extends between a pair of adjacent sidewalls 224, and, similarly, each upper trough 220 extends between an adjacent pair of sidewalls 224 such that one upper peak 216 and an adjacent upper trough 220 share a common sidewall 224. Similarly, with respect to lower flutes 208, each lower peak 218 extends between a pair of adjacent sidewalls 226, and, similarly, each lower trough 222 extends between an adjacent pair of sidewalls 226 such that one lower peak 218 and an adjacent lower trough 222 share a common sidewall 226.

In the exemplary implementation, flow mixer 200 is configured such that each upper flute 206 is oriented in parallel with an opposing lower flute 208. That is, each upper flute 206 of the plurality of upper flutes 206 is generally aligned along on an axis Y, such as illustrated in FIG. 6, namely, $Y_1$, $Y_2$, etc., and a corresponding lower flute 208 of the plurality of lower flutes 208 is aligned along the same axis $Y_1$, $Y_2$, etc. More specifically, an apex 228 (shown in FIG. 3) of each upper trough 220 is aligned with an apex 230 (shown in FIG. 3) of a corresponding lower trough 222 such that apexes 228 and 230 are spaced apart by predetermined distance $D_1$ along a respective axis Y. Because upper troughs 220 are aligned with a corresponding lower trough 222, it follows that each upper peak 216 is aligned with a corresponding lower peak 218 and that upper sidewalls 224 are aligned with lower sidewalls 226.

Referring, for example, to FIG. 2, upper peaks 216 and lower peaks 218 and upper troughs 220 and lower troughs 222 facilitate mixing cool ambient air 124 with hot exhaust gases 122 to facilitate producing a steady and spatially uniform flow of gas mixture 126 (shown in FIG. 1. In operation, the flow of ambient air 124 is directed along exhaust duct 118 and around peaks 216 and 218 and through troughs 220 and 222 where at least a portion of the flow of ambient air 124 is directed towards an axis 232. Simultaneously, hot exhaust gases 122 are directed through exhaust duct 118, through peaks 216 and 218, and around troughs 220 and 222, where at least a portion of hot exhaust gases 122 is directed towards axis 232. Peaks 216 and 218 and troughs 220 and 222 substantially vertically "slice" each respective flow of ambient air 124 and gases 122 to facilitate mixing flows of gases 122 and ambient air 124 into the flow of gas mixture 126 that is cooler than the flow of hot exhaust gases 122.

FIG. 3A is an enlarged view of a portion 5 (shown in FIG. 2) of flow mixer 200 illustrating an exemplary stiffener mechanism 300 and retainer, generally, 400, coupled thereto. Retainer 400 is discussed in more detail below. Stiffener mechanism 300 is coupled between an upper flute 206 and a corresponding lower flute 208, and, more specifically, between an upper trough 220 and a corresponding lower trough 222. In such a configuration, stiffener mechanism 300 can restrict movement of upper flutes 206 and lower flutes 208 with respect to each other. Coupling upper flutes 206 and lower flutes 208 together using stiffener mechanism 300 facilitates raising the natural frequency of flow mixer 200 sufficiently to prevent or avoid deflections of upper flutes 206 and lower flutes 208 resulting from resonance with a rotor frequency. Although stiffener mechanism 300 is described herein as extending between corresponding upper and lower sets of upper flutes 206 and lower flutes 208 of flow mixer 200, it is contemplated that stiffener mechanism 300 may be used on any fluted flow mixer and is not limited to use with only flow mixer 200 as described herein. For example, stiffener mechanism 300 may extend between two or more flutes of a substantially radial flow mixer having circumferentially-spaced flutes. In such a configuration, stiffener mechanism 300 may extend between any number of flutes and is not restricted to extending between only two such flutes.

In the exemplary implementation, stiffener mechanism 300 includes an upper cap 302, a lower cap 304, and a flute tie, or body portion, 306 coupled between upper cap 302 and lower cap 304. One upper cap 302 is positioned within an upper trough 220 of each pair of opposing upper troughs 220 and lower troughs 222 such that an arcuate bottom surface 308 of upper cap 302 is in contact with a substantially complementary arcuate surface 234 of upper trough 220. Similarly, one lower cap 304 is positioned within a lower trough 222 of each pair of opposing upper and lower troughs 220 and 222 such that an arcuate bottom surface 310 of lower cap 304 is in contact with a substantially complementary arcuate surface 236 of lower trough 222.

Furthermore, each upper cap 302 includes an opening 312 defined therethrough that is configured to receive an upper fastener 314 inserted therein. Similarly, each lower cap 304 includes an opening 316 defined therethrough that is configured to receive a lower fastener 318 inserted therein. Each opening 312 and 316 is counter-bored such that the top of each fastener 314 and 318 is substantially flush with a top surface of a respective cap 302 and 304. As such, upper caps 302 and lower caps 304 and upper fasteners 314 and lower fasteners 318 have a substantially thin profile within respective upper troughs 220 and lower troughs 222. The thin profile of caps 302 and 304 facilitates a laminar airflow over the top of caps 302 and 304 such that caps 302 and 304 do not interfere with the performance of flow mixer 200 and/or cause turbulence in the airflow. In some implementations, each of upper caps 302 and lower caps 304 include at least one flow mixing feature, such as a flute F, that facilitates efficient mixing of hot exhaust gases 122 with ambient air 124.

In the exemplary implementation shown in FIG. 3B, body portion 306 of stiffener mechanism 300 includes an upper end 320 coupled to upper trough 220 and a lower end 322 coupled to lower trough 222. Upper end 320 includes an upper opening 324 that is aligned with opening 312 in upper cap 302 such that upper fastener 314 is inserted through opening 312, through upper trough 220, and into opening 324. As such, at least a portion of upper trough 220 is coupled between upper cap 302 and upper end 320 of body portion 306. Similarly, lower end 322 includes a lower opening 326 that is aligned with opening 316 in lower cap 304 such that lower fastener 318 is inserted through opening 316, through lower trough 222, and into the lower opening 326. As such, at least a portion of lower trough 222 is coupled between lower cap 304 and lower end 322 of body portion 306. In a configuration in which each of fasteners 314 and 318 are oriented substantially parallel to respective sidewalls 224 and 226, fasteners 314 and 318 are subjected to primarily tension and/or compression loading when upper flutes 206 and lower flutes 208 are subjected to stresses that would cause deflections if not for stiffener mechanism 300.

In the exemplary implementation, body portion 306 is configured to not unnecessarily impede the flow of hot exhaust gases 122 (shown in FIG. 1) through outlet end 204. As such, body portion 306 facilitates maintaining the aerodynamic and performance features of flow mixer 200. In another suitable embodiment, body portion 306 includes any cross-sectional profile shape that enables flow mixer 200 to operate as described herein.

In the implementation shown in FIGS. 3A and 3B, stiffener mechanism 300 is fabricated from a metallic or metal alloy material that is able to repeatedly withstand exposure to hot exhaust gases 122. In another suitable implementation, stiffener mechanism 300 is fabricated from a CMC material. Generally, stiffener mechanism 300 may be fabricated from any material that facilitates operation of exhaust system 114 as described herein. Furthermore, in one implementation, body portion 306 may be fabricated from a different material than upper caps 302 and lower caps 304. The in exemplary implementation, body portion 306 is removable from caps 302 and 304 and from flow mixer 200 to enable replacement thereof due to impact events or prolonged exposure. Additionally, body portion 306 may be substantially hollow with the exception of where fasteners 314 and 318 are inserted therein. Such a hollow structure reduces the weight of stiffener mechanism 300 and may be fabricated using a 3-dimensional printing process of any material described above.

Although FIGS. 2, 3A, and 3B depict a stiffener mechanism 300 between each pair or corresponding upper flutes 206 and lower flutes 208, it is contemplated that flow mixer 200 may include fewer stiffener mechanisms 300, such as at only every other pair of flutes 206 and 208 or only a stiffener mechanism 300 at the ends of each plurality of flutes 206 and 208. Generally, flow mixer 200 may include any number of stiffener mechanisms 300 that enable exhaust system 114 to operate as described herein.

Turning to FIGS. 2, 3A and 3B, the retainer 400 of stiffener mechanism 300 will be discussed in more detail. In FIG. 2, retainer 400 is shown spanning between and interconnecting the body portions 306 joining opposing upper troughs 220 and lower troughs 222 of flutes F, each of the flutes defining a height dimension H and a width dimension W generally perpendicular to the height dimension, wherein the height dimension is greater than the width dimension. The joining together of body portions, or flute ties, 306 adds further rigidity and stiffness to flow mixer 200, thereby facilitating the further raising the natural frequency of flow mixer 200.

Retainer, generally 400, could be a single member or could include two or more retainer segments (as shown in FIGS. 7 and 8A), can be implemented in a variety of different configurations for stiffening exhaust system 114, and only several of such configurations are shown herein. In the implementation shown in FIG. 2, retainer 400 extends generally perpendicular to one or more vertical axes, e.g., $Y_{1-5}$ (shown in FIG. 6) that extend collinear to the respective height dimension H of each flute F. Such vertical axes are generally parallel to one another and, accordingly, are generally perpendicular with respect to and correspond to the width dimensions W that are measured in the direction of horizontal axes X, e.g., $X_1$, $X_2$, of each flute F of an upper row 207 and a lower row 209 of flutes F (shown in FIG. 6). Flutes F in upper row 207 are considered to be upper flutes 206, and flutes F in lower row 209 are considered to be lower flutes 208. Retainer 400 is configured to generally restrain relative movement between adjacent flutes F and also between flutes F and remainder of the exhaust system 114, including inlet portion 202 and the outlet portion 204.

Retainer 400 is, in one implementation, an elongated strip having a top surface 401, a bottom surface 402, and a rear surface, or trailing edge, 403, and could be constructed of a material such as INCONEL® 625, or any other suitable material. ("Inconel" is a registered trademark of Huntington Alloys Corporation of West Virginia, USA.) Retainer 400 can be coupled to troughs 220 and/or 222 of flutes F via one or more flute ties 306 by welding, adhesive, mechanical fasteners (not shown), or other suitable means. In one implementation, the trailing surface of flute ties 306 may include a slot or notch 307 (FIG. 3B) configured to receive retainer 400. The notch 307 may include an angled or curved surface complimentary to the dog-eared, or faceted, cross-section of a generally aerodynamic leading edge 404 of retainer 400 formed from angled surfaces 404a, 404b, 404c (FIGS. 5A and 5B), configured to reduce drag of the flow of exhaust over the retainer 400. Alternately, retainer 400 could be coupled to troughs 220 and/or 222 of flutes F by being formed integrally with flute ties 306 and/or integrally with flutes F and/or flow mixer 200, if desired. While the length, width, and thickness of retainer 400 can be different depending on particular applications and configurations, in one non-limiting implementation, retainer 400 can be between approximately 17 inches (43.2cm) and 18 inches (45.7 centimeters (cm)) in length, between approximately 0.2 inches (0.51 cm) and 0.3 inches (0.76 cm) in width 410 and between approximately 0.100 +/−0.009 inches (0.25 +/−0.02 cm) and 0.2 +/−0.009inches (0.51 +/−0.02 cm) in thickness 408.

Retainer 400 could also be directly attached to the troughs 220 and/or 222 of flutes F in in addition or instead of to flute ties 306, either directly to such troughs 220 and/or 222, such as by welding, bonding, adhesives, etc., or by mechanical fasteners, such as show in FIG. 4. In FIG. 4, retainers 400a and 400b are each attached to caps 302 and/or 304, respectively by welds 407, adhesive, or some other suitable attachment. Caps 302 and 304 are received within troughs 220 and 222 respectively, and into or through openings (not shown) in troughs 220 and/or 222. A washer 313 is interposed between an upper fastener 314 and opening 312 of upper cap 302 and between a lower fastener 318 and opening 316 of lower cap 304. The bottom surface 308 of upper cap 302 is curved to nest within upper trough 220, and similarly, the bottom surface 310 of lower cap 304 is curved to be received by and nest within lower trough 222.

FIG. 6 illustrates another alternate implementation wherein a flow mixer 200a includes five upper troughs 220 coupled together directly with retainer 400c, and five lower troughs 222 are coupled together with retainer 400d . The five upper troughs are axially opposed to the five lower troughs along axes $Y_1$, $Y_2$, $Y_3$, $Y_4$, and $Y_5$, respectively.

Retainers 400c and 400d could be coupled to troughs 220 and/or 222, respectively, through use of adhesive, welds, integral formation with troughs 220 and/or 222, and/or some other suitable fastening manner. In this implementation, flute ties 306 may be eliminated, and in such case, the upper flutes 220 will be generally fixed with respect to relative movement to one another, and likewise, the lower troughs 222 will be generally limited to relative movement with respect to one another; however, the upper row 207 of flutes F could experience at least relative lateral movement with respect to the lower row 209 of flutes F. Depending on the application, allowing for relative generally lateral movement between upper row 207 and lower row 209 of flutes F may be desirable.

FIG. 7 illustrates an alternate implementation, wherein a flow mixer 200b includes flutes F' extending generally radially from a center C. Retainers, or retainer segments, 400e directly attach to troughs between adjacent flutes F', via caps 302a and fasteners 314a, to reduce relative movement between the flutes F' and thereby stiffen flow mixer 200b. Instead of caps 302a and fasteners 314a, retainers 400e could be coupled to the troughs through welding, adhesives, bonding, and/or integral formation with the flutes F' or in some other suitable manner.

FIG. 8A illustrates an example alternate implementation, wherein a flow mixer 200c includes a row of upper flutes 206a and a row of lower flutes 208a, with opposed pairs of upper and lower flutes F each being interconnected via mechanical fasteners, such as upper caps 302 and lower caps 304 to flute ties 306. However, it is to be understood that flute ties 306 could be coupled to the flutes through welding, adhesive, integral formation with the flutes F or in some other suitable manner. A first retainer 400f couples together two pairs of outboard flutes $F_a$ on one side of flow mixer 200c. A second retainer 400g couples together two pairs of outboard flutes $F_c$ on the other side of flow mixer 200. The center, or middle, pair of opposed flutes $F_b$ is not laterally restrained by a retainer and is thus freer to experience relative movement with respect to either of the remaining pairs of flutes $F_a$, $F_b$. This selective application of retainers to specific pairs of flutes allows for the tailoring of stiffness and, accordingly, natural frequency characteristics for a given situation and/or environment of flow mixer 200c.

FIG. 8B illustrates another example alternate implementation, wherein a flow mixer 200d includes a row of upper flutes 206a and a row of lower flutes 208a, with opposed pairs of upper and lower flutes F each being interconnected via mechanical fasteners, such as upper caps 302 and lower caps 304 to flute ties 306. As noted above, it is to be understood that flute ties 306 could be coupled to the flutes through welding, adhesives, mechanical fasteners, integral formation with the flutes F or in some other suitable manner. Retainer 400h joins together three center, or middle, pair of flutes $F_d$, while each outboard pair of flutes $F_e$, $F_f$ of flow mixer 200d is not laterally restrained by retainer 400h, and each outboard pair of flutes $F_e$, $F_f$ is thus relatively free to experience relative movement with respect to each other and with respect to the three central pairs of flutes $F_d$, as well as the other outboard pair of flutes. This is another non-limiting selective application of retainers which may be used to tailor the stiffness and, accordingly, the natural frequency characteristics for a given situation and/or environment of flow mixer 200d.

Given the above, in one implementation, the resonant frequency of an exhaust system may be increased by selecting flutes F to be restrained and orienting the elongated retainer to extend generally perpendicular to the elongated axis of each of the selected flutes, and, while maintaining the elongated retainer generally perpendicular to the elongated axis of each of the flutes, coupling the retainer to the flutes directly and/or to flute ties 306 attached to such selected flutes, such that the retainer 400 generally restrains movement between the selected flutes.

The examples described herein include systems and apparatuses that are able to raise the natural frequency of a flow mixer in order to avoid the resonant frequencies of cyclical vibrations, such as the operation of one or more rotors, propellers, etc. The examples described herein include flow mixers that include a plurality of flutes for mixing of a hot exhaust air stream and a relatively cooler ambient air stream. The flow mixers include a stiffener mechanism having ties that extend between the upper and lower flutes and one or more horizontally extending retainers that connect, or couple, two or more of the flute ties together and being configured to prevent deflections of the flutes due to vibrational stresses and resonant frequencies. In one implementation, the stiffener mechanism includes caps positioned within corresponding upper and lower flute troughs and a body portion that extends between the troughs and is coupled to each of the caps. In such a configuration, the stiffener mechanism is loaded primarily with tension/compression forces during operation. In another implementation, a laterally-extending retainer strip is coupled to one or more flute ties to generally fix or restrain relative movement of the flute ties, and correspondingly, the flutes to which the flute ties are coupled, thereby providing a stiffening effect. In another implementation, the stiffener mechanism is integrally formed between the upper and lower flutes and the adjacent fluted ties of the flow mixer. In yet another implementation, the stiffener mechanism is coupled to corresponding sidewalls of the flutes such that the stiffener mechanism is loaded primarily with shear forces during operation.

The implementations described herein facilitate raising the natural frequency of the flow mixer and preventing deflection of the flow mixer flutes due to aligning resonant frequencies and rotor vibrations. Such stiffening enables the use of larger size mixers that may provide more efficient flow mixing and which may also lengthen the service lifetime of the flow mixer due to reduced material fatigue. As such, the costs associated with manufacturing and maintaining multiple flow mixers may be reduced. Additionally, the stiffening potentially creates a more constant flute area, which could facilitate more efficient flow mixing, and while maintaining the aerodynamic shape and properties of the flow mixer.

Accordingly, a method is described herein of increasing the resonant frequency of exhaust system 114, which has at least one exhaust duct 118 with flutes F. As shown in FIG. 6, each flute F includes a trough 220 or 222 and an elongated portion 217 with a respective axis $Y_1$, $Y_2$, etc. and a lateral portion 219 having width W extending generally perpendicular to the respective axis $Y_1$, $Y_2$, etc., such that the length of the elongated portion 217 is greater than the width W of such lateral portion 219. The method includes selecting a first flute 221 from the plurality of flutes F, the first flute having a first axis $Y_1$, and also selecting a second flute 223. The second flute 223 has a second axis $Y_2$ generally parallel to the first axis $Y_1$. The method includes orienting a retainer 400c to extend generally perpendicular to the first and second axes $Y_1$, $Y_2$. The method also includes coupling a first portion 225 of the retainer 400c to the trough 220 of the first flute 221 and a second portion 227 of the retainer 400c to the trough 220 of the second flute 223 such that the retainer 400c generally restrains movement between the first flute 221 and the second flute 223.

Referring FIG. 9, implementations of the disclosure may be described in the context of an aircraft manufacturing and service method 10 and via an aircraft 12 (shown in FIG. 10). Aircraft 100 (shown in FIG. 1) is an example of aircraft 12. During method 10, specification and design data of aircraft 12 may be used 14 during the manufacturing process and other materials associated with the airframe may be procured 16. During production, component and subassembly manufacturing 18 and system integration 20 of aircraft 12 occurs, prior to aircraft 12 entering its certification and delivery process 22. Upon successful satisfaction and completion of airframe certification, aircraft 12 may be placed in service 24. While in service by a customer, aircraft 12 is scheduled for periodic, routine, and scheduled maintenance and service 26, including any modification, reconfiguration, and/or refurbishment, for example. In alternative implementations, manufacturing and service method 10 may be implemented viavehicles other than an aircraft. The exhaust duct 118 and/or stiffener mechanism 300 described herein may be procured 16, assembled 18, integrated 20, and/or maintained/serviced 26.

Each portion and process associated with aircraft manufacturing and/or service 10 may be performed or completed by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 10, aircraft 12 produced via method 10 may include an airframe 28 having a plurality of systems 30 and an interior 32. Examples of high-level systems 30 include one or more of a propulsion system 34, an electrical system 36, a hydraulic system 38, and/or an environmental system 40. Any number of other systems may be included. In particular implementations, the exhaust duct 118 and/or stiffener mechanism 300 are parts of propulsion system 34.

Apparatus and methods embodied herein may be employed during any one or more of the stages of method 10. For example, components or subassemblies corresponding to production process 18 may be fabricated or manufactured in a manner similar to components or subassemblies produced while aircraft 12 is in service. Also, one or more apparatus implementations, method implementations, or a combination thereof may be utilized during the production stages 18 and 20, for example, by substantially expediting assembly of, and/or reducing the cost of assembly of aircraft 12. Similarly, one or more of apparatus implementations, method implementations, or a combination thereof may be utilized while aircraft 12 is being serviced or maintained, for example, during scheduled maintenance and service 26.

Further, in an alternative implementation, the aircraft manufacturing and service method described herein may be used in any manufacturing, modification, repair and/or service operation.

In summary, the implementations described herein include a duct for directing a flow of exhaust, the duct including a wall portion defining a passageway having an inlet portion adapted to receive the flow of exhaust and an outlet portion adapted to discharge the flow of exhaust. A plurality of flutes is defined at the outlet portion, and the plurality of flutes include a first flute and a second flute spaced from the first flute. The first flute has a peak, a trough, a first height dimension and a first width dimension generally perpendicular to the first height dimension, and the second flute has a peak, a trough, a second height dimension and a second width dimension generally perpendicular to the second height dimension. At least one retainer is coupled to the trough of the first flute and the trough of the second flute and extends generally parallel to at least one of the first width dimension and the second width dimension, wherein the retainer is configured to restrain relative movement between the first flute and the second flute and relative movement among the first flute, the second flute, and at least one of the inlet portion and the outlet portion during the flow of exhaust through the duct.

In an implementation, a first axis corresponds to the first height dimension and a second axis corresponds to the second height dimension, and the first axis and the second axis are generally parallel to one another.

In another implementation, the first flute is adjacent the second flute, and in another aspect a fourth flute is generally opposed to the second flute, and a second flute tie is coupled to the fourth flute and the second flute. In further aspects, the third flute has a third height dimension and a third axis corresponds to the third height dimension, the fourth flute has a fourth height dimension and a fourth axis corresponds to the fourth height dimension, and the third axis and the fourth axis are generally parallel to one another. In a still further aspect, the retainer is coupled to the first flute tie and second flute tie.

In an implementation, the retainer is an elongated strip configured to extend at least between the first flute and the second flute, and in another aspect the retainer includes a generally aerodynamic angled leading edge configured to reduce drag of the flow of exhaust over the retainer.

In a further implementation, a third flute is generally opposed to the first flute, and a first flute tie coupled to the third flute and the first flute, and in another aspect, a first axis corresponds to the first height dimension, the third flute has a third height dimension, and a third axis corresponds to the third height dimension, and wherein the first axis and the third axis are generally collinear with respect to one another.

In another implementation, the retainer is welded, bonded, adhered, formed integrally with the first flute tie and second flute tie and/or mechanically fastened to the first flute tie and the second flute tie. In one aspect, a first mechanical fastener is coupled to the first flute, a second mechanical fastener is coupled to the second flute, and the retainer is coupled to at least one of the first mechanical fastener and the second mechanical fastener. In a further aspect, the at least one retainer includes a first retainer and a second retainer, and the duct further includes a first mechanical fastener coupled to the first flute, a second mechanical fastener coupled to the second flute, the first retainer coupled to the first mechanical fastener, and the second retainer coupled to the second mechanical fastener.

In another implementation, the outlet portion of the duct has a centerline, a first axis corresponds to the first height dimension, and a second axis corresponds to the second height dimension, and the first axis and the second axis extend generally radially with respect to the centerline.

In an implementation of the duct, a third flute is generally opposed to the first flute, and a first flute tie is coupled to the third flute and the first flute. A fourth flute is generally opposed to the second flute, and a second flute tie is coupled to the fourth flute and the second flute. A fifth flute is between the first flute and the second flute, and a sixth flute is generally opposed to the fifth flute.

In another implementation, the retainer is coupled to the first flute tie and the second flute tie, and the third flute is configured to have freedom of movement with respect to at least one of the retainer, the first flute, the second flute, the third flute, and the fourth flute. In another aspect, a third flute tie is coupled to the fifth flute tie and the sixth flute tie and/or the retainer is coupled to the first flute tie, the second flute tie, and the third flute tie.

In a further implementation, a third flute is generally opposed to the first flute, and a first flute tie is coupled to the third flute and the first flute. A fourth flute is generally opposed to the second flute, and a second flute tie is coupled to the fourth flute and the second flute. A fifth flute is included, and a sixth flute is generally opposed to the fifth flute. A seventh flute is included, and an eighth flute is generally opposed to the seventh flute. In a further aspect, a third flute tie coupled to the fifth flute and the sixth flute, and a fourth flute tie coupled to the seventh flute and the eighth flute. Additional aspects include the at least one retainer having a first retainer and a second retainer and/or the first retainer coupled to at least the first flute tie and the second flute tie, and the second retainer coupled to at least the third flute tie and the fourth flute tie. In other aspects, at least one of the plurality of flutes is configured to have freedom of movement with respect to at least one other of the plurality of flutes and/or the retainer is coupled to the first flute tie, the second flute tie, the third flute tie, and the fourth flute tie.

In an implementation of the duct, the plurality of flutes are arranged in opposing rows of flutes and/or the first height dimension is greater than the first width dimension and the second height dimension is greater than the second width dimension.

In another implementation, a stiffener apparatus for an exhaust duct includes a first row of flutes and a second row of flutes generally opposite to the first row of flutes, and each flute is elongated along a respective axis, and the stiffener apparatus includes at least two flute ties coupling together at least two flutes from the first row of flutes to at least two flutes from the second row of flutes. At least one retainer is coupled to the at least two flute ties and extends generally perpendicularly to the axis of each of the at least two flutes from the first row of flutes and the at least two flutes from the second row of flutes, wherein the retainer is configured to generally restrain relative movement between the at least two flutes from the first row of flutes and the at least two flutes from the second row of flutes.

In a further implementation, a method is described for increasing the resonant frequency of an exhaust system having at least one duct, the duct including a plurality of flutes. Each flute includes a trough and an elongated portion with a respective axis and a lateral portion extending generally perpendicular to the respective axis, wherein the length of the elongated portion is greater than the width of the lateral portion. The method includes selecting a first flute from the plurality of flutes, the first flute having a first axis and selecting a second flute from the plurality of flutes, the second flute having a second axis generally parallel to the first axis. The retainer is oriented to extend generally perpendicular to the first and second axes, and a first portion of the retainer is coupled to the trough of the first flute and a second portion of the retainer is coupled to the trough of the second flute such that the retainer generally restrains movement between the first flute and the second flute.

In another aspect, a method is described for increasing the resonant frequency of an exhaust system having at least one duct, the duct including at least one row of flutes with a first side of the row having flutes oriented in a first direction and a second side of the row having flutes oriented in a second direction generally opposite to the first direction. Each flute defines an elongated portion extending along a respective axis and a lateral portion extending generally perpendicular to the respective axis, wherein the length of the elongated portion is greater than the width of the lateral portion. The method includes selecting a first flute and a second flute from the first side of the row of flutes and selecting a third flute and a fourth flute from the second side of the row of flutes. A first flute tie is coupled to the first flute and the third flute such that the first flute tie is generally parallel to the axis of each of the first flute and the third flute, and a second flute tie is coupled to the second flute and the fourth flute such that the second flute tie is generally parallel to the axis of each of the second flute and the fourth flute. A retainer is oriented generally perpendicular to a length of at least one of the first flute tie and the second flute tie. A first portion of the retainer is coupled to the first flute, and a second portion of the retainer is coupled to the second flute such that the retainer restrains movement between the first flute and the second flute, wherein the retainer restrains movement among the first flute, second flute, third flute, and fourth flute.

In another implementation, an aircraft exhaust system includes a duct as described herein.

Although specific features of various examples of the invention may be shown in some drawings and not in others, this is for convenience only. In accordance with the principles of the invention, any feature of a drawing may be referenced and/or claimed in combination with any feature of any other drawing.

This written description uses examples to disclose various examples, which include the best mode, to enable any person skilled in the art to practice those examples, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal of the claims.

What is claimed is:

1. A duct for directing a flow of exhaust gases, the duct comprising:
   a wall portion defining a passageway having an inlet portion adapted to receive the flow of exhaust gases and an outlet portion adapted to discharge the flow of exhaust gases;
   a plurality of flutes defined at the outlet portion, the plurality of flutes including a first flute and a second flute spaced from the first flute, the first flute having a first peak, a first trough, a first height dimension, and a first width dimension generally perpendicular to the first height dimension, the second flute having a second peak, a second trough, a second height dimension, and a second width dimension generally perpendicular to the second height dimension; and
   at least one retainer coupled to the first trough and the second trough and extending generally parallel to at least one of the first width dimension and the second width dimension, wherein the at least one retainer is configured to restrain relative movement between the first flute and the second flute and relative movement among the first flute, the second flute, and at least one of the inlet portion and the outlet portion during the flow of exhaust gases through the duct.

2. The duct of claim 1, further comprising:
a third flute generally opposed to the first flute;
a fourth flute generally opposed to the second flute; and
at least one flute tie;
wherein the at least one flute tie comprises:
a first flute tie coupled to the third flute and the first flute; and
a second flute tie coupled to the fourth flute and the second flute; and
wherein the at least one retainer is coupled to the first flute tie and the second flute tie.

3. The duct of claim 2, wherein a first axis corresponds to the first height dimension, the third flute has a third height dimension, and a third axis corresponds to the third height dimension, and
wherein the first axis and the third axis are generally collinear with respect to one another.

4. The duct of claim 2, wherein the third flute has a third height dimension and a third axis corresponds to the third height dimension, and the fourth flute has a fourth height dimension and a fourth axis corresponds to the fourth height dimension, and
wherein the third axis and the fourth axis are generally parallel to one another.

5. The duct of claim 2, wherein:
the first flute is adjacent the second flute;
the third flute is adjacent the fourth flute; and
the first flute tie is generally parallel to the second flute tie.

6. The duct of claim 1, wherein a first axis corresponds to the first height dimension and a second axis corresponds to the second height dimension, and
wherein the first axis and the second axis are generally parallel to one another.

7. The duct of claim 1, wherein the outlet portion has a centerline, a first axis corresponds to the first height dimension, and a second axis corresponds to the second height dimension, and
wherein the first axis and the second axis extend generally radially with respect to the centerline.

8. The duct of claim 1, further comprising:
a third flute generally opposed to the first flute;
a fourth flute generally opposed to the second flute;
a fifth flute between the first flute and the second flute;
a sixth flute generally opposed to the fifth flute; and
at least one flute tie;
wherein the at least one flute tie comprises:
a first flute tie coupled to the third flute and the first flute; and
a second flute tie coupled to the fourth flute and the second flute.

9. The duct of claim 8, wherein the at least one retainer is coupled to the first flute tie and the second flute tie, and
wherein the third flute is configured to have freedom of movement with respect to at least one of the at least one retainer, the first flute, the second flute, and the fourth flute.

10. The duct of claim 8, further comprising a third flute tie coupled to the fifth flute and the sixth flute.

11. The duct of claim 10, wherein the at least one retainer is coupled to the first flute tie, the second flute tie, and the third flute tie.

12. The duct of claim 1, further comprising:
a third flute generally opposed to the first flute;
a fourth flute generally opposed to the second flute;
a fifth flute;
a sixth flute generally opposed to the fifth flute;
a seventh flute;
an eighth flute generally opposed to the seventh flute; and
at least one flute tie;
wherein the at least one flute tie comprises:
a first flute tie coupled to the third flute and the first flute;
a second flute tie coupled to the fourth flute and the second flute.

13. The duct of claim 12, further comprising:
a third flute tie coupled to the fifth flute and the sixth flute; and
a fourth flute tie coupled to the seventh flute and the eighth flute.

14. The duct of claim 13, wherein the at least one retainer comprises a first retainer and a second retainer.

15. The duct of claim 13, wherein the at least one retainer is coupled to the first flute tie, the second flute tie, the third flute tie, and the fourth flute tie.

16. The duct of claim 14, wherein the first retainer is coupled to at least the first flute tie and the second flute tie, and
wherein the second retainer is coupled to at least the third flute tie and the fourth flute tie.

17. The duct of claim 14, wherein at least one of the plurality of flutes is configured to have freedom of movement with respect to at least one other of the plurality of flutes.

18. The duct of claim 1, wherein the first height dimension is greater than the first width dimension, and
wherein the second height dimension is greater than the second width dimension.

19. A stiffener mechanism for an exhaust duct, the exhaust duct including a first row of flutes and a second row of flutes generally opposite to the first row of flutes, each flute being elongated along a respective axis, the stiffener mechanism comprising:
at least two flute ties coupling together at least two flutes from the first row of flutes to at least two flutes from the second row of flutes; and
at least one retainer coupled to the at least two flute ties and extending generally perpendicularly to the axis of each of the at least two flutes from the first row of flutes and the at least two flutes from the second row of flutes;
wherein the at least one retainer is configured to generally restrain relative movement between the at least two flutes from the first row of flutes and the at least two flutes from the second row of flutes.

20. A method of increasing a resonant frequency of an exhaust system having at least one duct, the at least one duct including a plurality of flutes, each flute including a trough and an elongated portion with a respective axis and a lateral portion extending generally perpendicular to the respective axis, wherein a length of the elongated portion is greater than a width of the lateral portion, the method comprising:
selecting a first flute from the plurality of flutes, the first flute having a first axis;
selecting a second flute from the plurality of flutes, the second flute having a second axis generally parallel to the first axis;
orienting a retainer to extend generally perpendicular to the first and second axes; and
coupling a first portion of the retainer to the trough of the first flute and a second portion of the retainer to the trough of the second flute such that the retainer generally restrains movement between the first flute and the second flute.

\* \* \* \* \*